(No Model.) 2 Sheets—Sheet 1.
E. THOMSON.
ELECTRIC MOTOR.
No. 458,646. Patented Sept. 1, 1891.
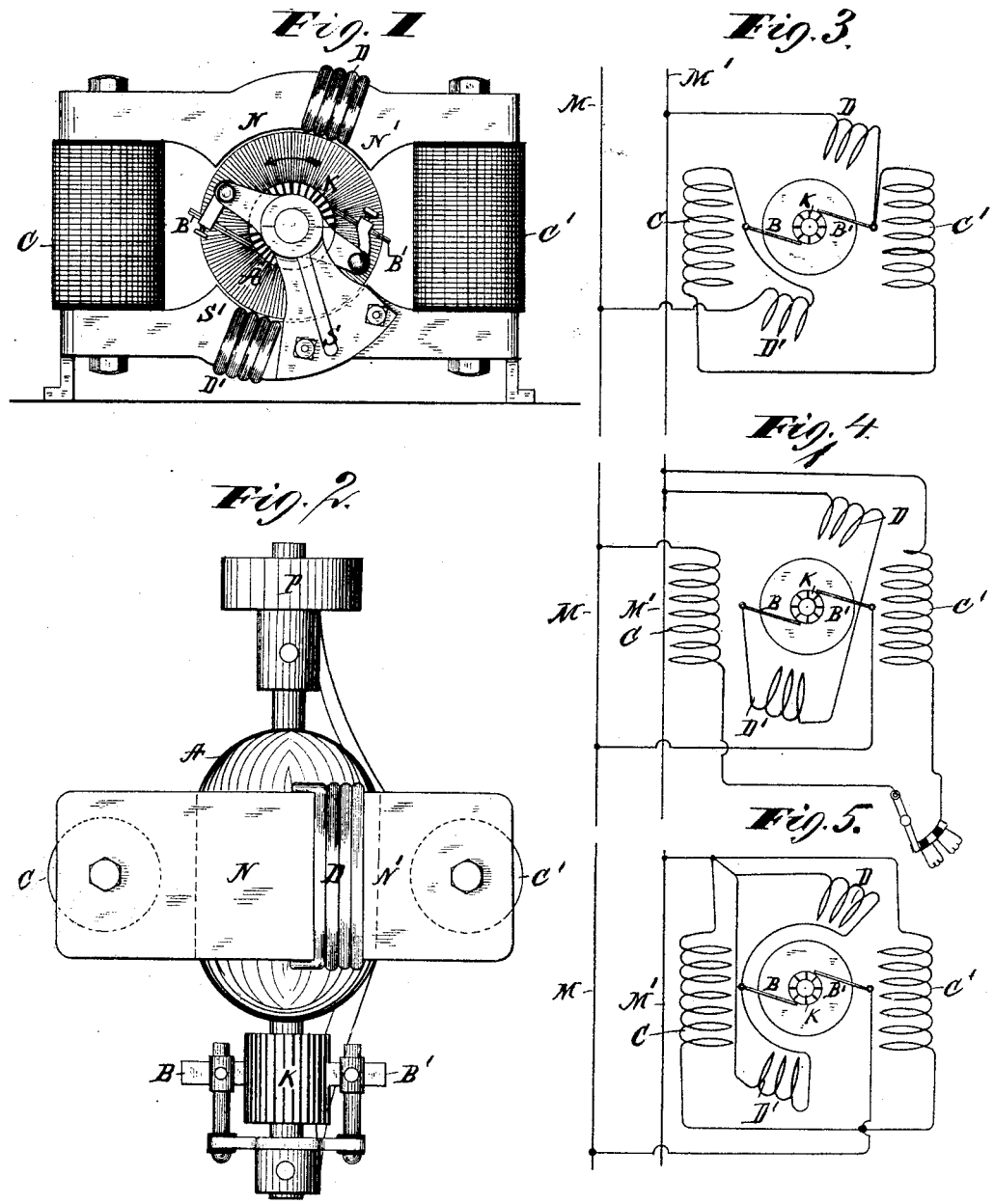
WITNESSES:
INVENTOR
Elihu Thomson
BY
Townsend & MacArthur
ATTORNEYS

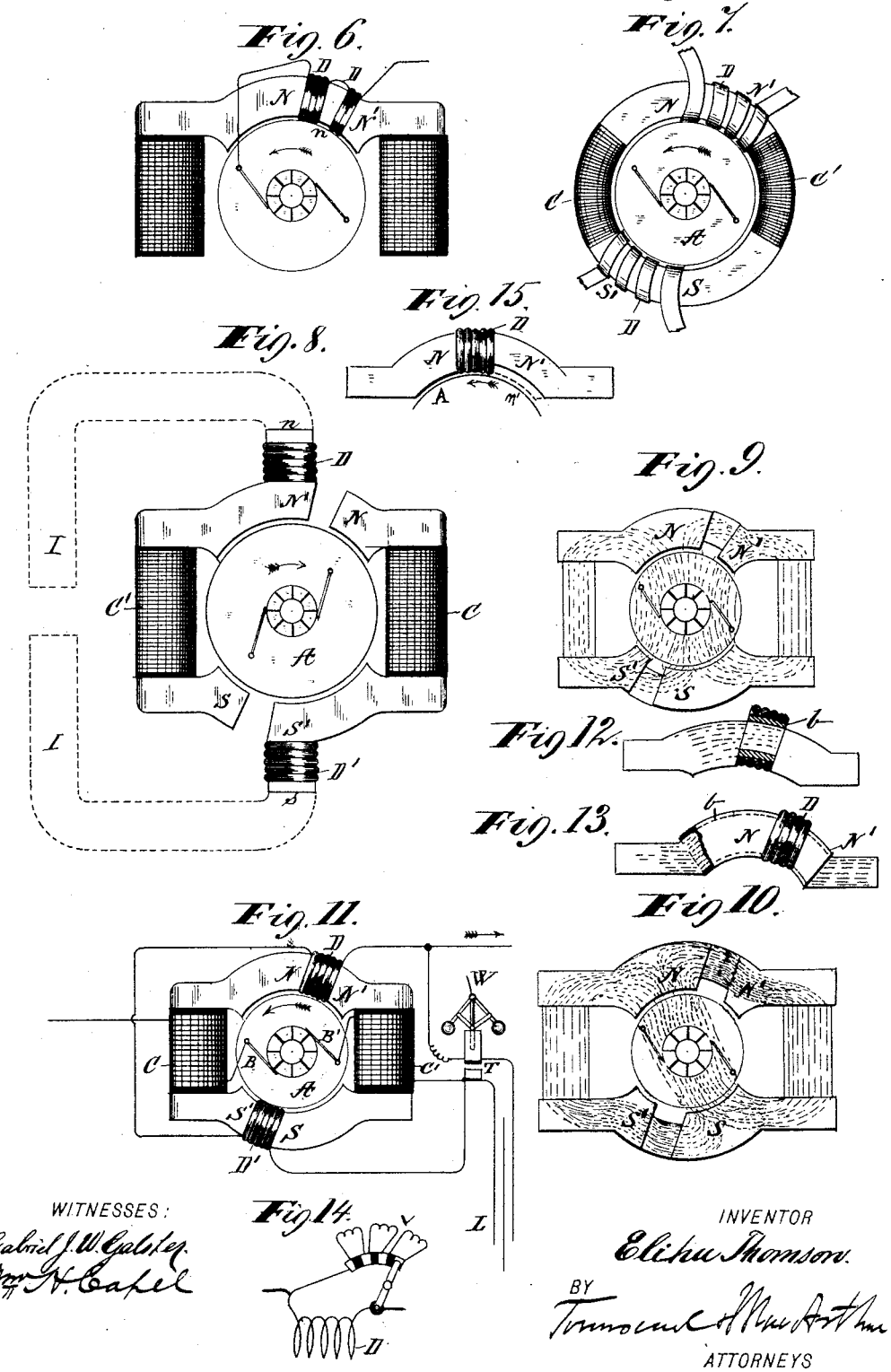

ELIHU THOMSON, OF LYNN, MASSACHUSETTS, ASSIGNOR TO THE THOMSON-HOUSTON ELECTRIC COMPANY, OF CONNECTICUT.

ELECTRIC MOTOR.

SPECIFICATION forming part of Letters Patent No. 458,646, dated September 1, 1891.

Application filed February 2, 1887. Serial No. 226,312. (No model.)

*To all whom it may concern:*

Be it known that I, ELIHU THOMSON, a citizen of the United States, and a resident of Lynn, in the county of Essex and State of Massachusetts, have invented a certain new and useful Electric Motor, of which the following is a specification.

The present invention relates to certain improvements which are designed to produce self-regulating or constant-speed electric motors for constant-potential lines and to obviate the usual objections and difficulties arising in the ordinary forms of such apparatus.

Certain parts of my invention are also applicable in modified ways to the production of a constant-current electric motor, which will maintain a nearly-constant speed under varying loads and adapted to run in an arc-light and other constant-current lines.

The chief object of my invention is, however, to construct a motor which when supplied with current of constant potential will maintain a practically constant speed under varying loads, and to obtain this result with constant non-sparking points on the commutator and without the danger of causing by overloading a loss of magnetism in the field-magnets of the motor.

It has long been a well-known fact that a dynamo which would maintain a constant potential at its terminals by compounding its field-series and shunt-windings on the same magnetic axis or by the employment of other devices for maintaining a proper field is also capable of being used as a motor by supplying it with constant-potential current, and that the current passing through its series field-coil will react upon the magnetism produced by the shunt-field, so as to tend to compensate for speed changes under varying loads; but one serious objection exists in the fact that the series field may at starting or by momentary overloading during running receive such a large influx of current as to kill or neutralize the field of the motor and bring it to rest, if not to reverse it. If brought to rest, it is in great danger of injury from excessive current and an overstrain or drain is brought upon the supply-line, giving rise to danger of injury to the line and generators unless a sensitive fusible cut-off be used.

In my invention I construct the field-magnets in a novel way to avoid the inconvenience just stated and to secure the important advantage of a compensated lead of the brushes under varying loads.

In the accompanying drawings, Figure 1 is an end elevation of a motor embodying my invention. Fig. 2 is a plan of the same. Figs. 3, 4, and 5 show circuit connections through the same from constant-potential mains. Figs. 6, 7, and 8 are modifications. Figs. 9 and 10 are diagrams illustrative of the magnetic actions displayed during change from no load to full load. Figs. 11, 12, and 13 show modifications adapting the motor to use on constant-current lines. Figs. 14 and 15 show details of modifications.

In Fig. 1, A indicates an armature of Gramme-Siemens or other pattern suitably mounted on a shaft running in journals and having a many-segment commutator K, with brushes B B' bearing thereon, which touch at the neutral point or line and generally with a slight lead in the direction of revolution, as indicated by the arrow. The poles N N' and S S' are placed as shown, and are joined by the cores of the coils C C' and convey the magnetism induced in such cores to the armature, as usual. The coils C C' are of fine wire and in shunt to the armature, forming a derived-circuit or shunt-field system. They produce like polarities in N N' of opposite character to that produced in S S', N N' being, for instance, both of north polarity and S S' of south polarity. It is obvious that the poles N N' S S' might be the poles of permanent magnets, instead of being excited by the coil in derived circuit, or that their magnetism might be maintained in any other of the various ways known in the art and suitable for the particular conditions of use. As thus constructed, the machine would be a simple shunt-field motor and would run upon a line of constant potential if the connections to the commutator-brushes and to the field-coils were made in the proper way, as usual; but should the demand for power vary the lead of the neutral line would change and require a change of set of the brushes around the commutator and prevent undue sparking, and the speed would also change with every variation in the demand for power or the strain upon the motor or its load. The pole-pieces N N', which may be either disconnected or connected, form together a pole-piece of the same polarity, which acts upon the armature in substantially the same manner as an ordinary continuous pole-piece. The part N' is preferably made smaller or of less circumferential extent than the part N, so as to magnetize the armature to a less degree. The two parts S S' of the opposite pole are similarly arranged. The same difference of effect might be obtained by arranging one part of the pole farther from the armature than the other part, as indicated in Fig. 15.

In the form of my invention indicated in Fig. 1 I connect the two parts of the pole by a short core of iron, upon which magnetizing-coils D D' are wound, the effect of current circulating in such coils being to weaken the normal polarity in the parts N' S' and to somewhat strengthen the normal polarity of the parts N S. The parts are seen in plan, Fig. 2, similarly lettered. The coarse wire coils D D', occupying the short cores mentioned, are preferably placed in the main circuit of or in series with the armature.

Various ways of connecting a pair of constant-potential mains M M' are shown in Figs. 3, 4, and 5. In Fig. 3 connection from main M is taken through coil D' to B and through commutator K and armature-coils to B', and thence to D and to M'. The coils C C' are put in shunt from brushes B B', as shown. In Fig. 4 the connection from M is directly through B', thence to and through coils D' and D in series to M'. The coils C C' in series are connected separately with the mains. In Fig. 5 the connection is modified by placing coils C C' in multiple and coils D D' also in multiple. This would be done to adapt a motor to run with lower potential or to adapt it to the use of finer wire in winding its coils. Of course a variable resistance may, if needed, be inserted into the shunt-field-coil circuits, as indicated in Fig. 4, to vary their current and magnetism, and a variable shunt V, Fig. 14, may be put around coils D or D', or both, to vary their effects, if needed. It is important that the connections through coils D and D' be made in such direction that when current passes in them they shall tend to establish a pole at N S of the same name as that produced by coils C C' in N and S and to tend to establish a pole at N' and at S' of the opposite name to that produced by coils C and C'—i.e., to tend to neutralize the poles N' and S' and to re-enforce poles N and S. Connecting the motor so constituted to a line of constant potential, as in Figs. 3, 4, and 5, will, if the proper proportions of magnetizing effects be obtained, result in a more or less complete compensation for change of lead and change of speed. In other words, the machine will approximate to a constant-speed motor with a constant lead of brushes. The proportions will vary with changes of dimensions of parts and other proportions, as well as with changes in quality of material used in construction, but can be determined, as pointed out, by varying the current in coils D D' and in C C', and subsequent reproductions may be permanently wound to match the conditions so determined. It is important, also, that the cores of the magnet-coils C C' be not too massive, but limited in section and energized by the current, so that they approach saturation, especially when the armature-core contains little iron or when the lead of the neutral line is very small.

In Fig. 6 the coil D is divided and wound in two positions, a small intermediate pole $n$ existing between N and N'. This division might be further carried into three, four, or more coils.

In Fig. 7 the field is ring-shaped, with the coils C C' wound thereon, as shown, and in lieu of a coil D and D' a flat strip of copper insulated from the iron ring field-core is wound and closely fitted thereto, tending to weaken N' and S' as poles and form poles at N and S. The armature A revolves, as before, in the center and in the direction of the arrow.

In Fig. 8 the coils D D' are wound upon extensions of N' and S', while the poles N and S are separated from poles N' and S' by an air-space or by a non-magnetic block. In the latter case, however, the two parts N N' act substantially as a common pole, as likewise do the two parts S S'. The effect of the coils D D' is to weaken the poles N' and S' by forming false poles or outwardly-extending poles of like polarity to N' and S' at $n$ and $s$, which may be extended by iron bars, such as cast-iron or the like, as indicated by the dotted lines I I. The effect of current in D or D' is to tend to make N' and S' neutral and $n$ and $s$ poles at the same time that poles N and S are in consequence somewhat strengthened in their action on the armature. The effects are similar to those of Figs. 1, 6, and 7, but weaker or less economical.

Fig. 9 represents the distribution of the field magnetism through the magnetic circuit formed by the field-cores and the armature-core when the coils C C' are alone traversed by current. The lines are pretty uniformly spread from the polar surfaces through the armature-core.

Fig. 10 shows the effect when coils D D' are acting as when energized by a strong current. The field magnetism finds its chief exit to the armature by the polar surfaces at N S, which, being of but limited extent, do not magnetize the armature-core to an equal degree as in Fig. 9 and magnetize it locally at N and S only; but the density of magnetism at the faces of the poles N' S' is very small. The magnetism, while somewhat reduced in amount, is shifted in the direction of the revolution of the armature and tends to counteract any increased lead of the brushes when the motor is heavily loaded and its armature and the coils D D' are traversed by a heavy current. At the same time the deformation of the field and diminished available field magnetism tends to cause an increase of speed of the armature, or, rather, to prevent a fall of speed when the load is put on, since to use a given electro-motive force the magnetism of a motor must be diminished under full load and increased under light load as a consequence of the resistance of the wire of the armature having a greater effect or requiring more electro-motive force to overcome it with a heavy current or load than with a light current or load in the armature.

In Fig. 11 is shown a modification to suit the running of the motor on constant-current lines similar to arc-light lines. The coils C C' are traversed by the main current of the line, as is also the armature A. The field established by the current in C C' in the poles N N' and S S' should be comparatively weak and the armature A be constructed as a rather strong magnet having much wire and iron and large self-induction, so as to secure a considerable forward lead for the brushes. As shown, the neutral line or lead line is under the poles N' S'. The coils D D' are placed either in a separate circuit or fed from the main circuit, but are only in action at intervals, as upon the opening of a contact at T (a shunt around D D') by a centrifugal governor W at a predetermined speed, the governor being driven by the motor. To avoid sparking at T, a condenser L may be put around the contacts. The increase of speed of the motor under light load causes the governor W to open contact at T and put current into coils D D'. These coils are wound and connected so that the current neutralizes poles N and S and strengthens poles N' and S'; but this action cuts down the power of the motor greatly by virtue of the fact that the brushes B B' touch the commutator when the armature-coils are under the middle of poles N' and S'. A slacking of speed ensues and a reclosing of contact at T. The actions are frequently repeated during running. It is best to put a closed copper band or circuit under the coils D D', Fig. 11, or parallel thereto to render their action sluggish. The induced current in the band tends to slow the effect of putting coils D and D' into circuit and removing them. The heavier the band used the more gradual will the effects be, and the speed is less liable to undergo quick fluctuations. The band is shown at b, Fig. 12. A better plan is to incase the field-poles N N', Fig. 13, in a copper sheath or to plate a thick copper coat thereon and all over. This sheath or coat will be the seat of induced currents, rendering the action of D sluggish in shifting the magnetic polarities.

While in the foregoing description the polar portions N and N', S and S' have been described as of unequal extent, it is in no wise inconsistent with my invention to make them of equal extent and to place the coils D D' in the middle of the compound pole or at equal distances from the extremities which are near the coils C C', and with some proportions of the apparatus such a disposition may be the preferable one, and would be represented in Fig. 15 when both the pole N and pole N' approach equally near the revolving armature, as indicated by dotted lines at n' in said figure.

What I claim as my invention is—

1. The combination, with the rearward portion of the field-magnet pole piece or pieces of the same name, of a supplemental coil applied to such rearward portion and tending to weaken the same.

2. The combination, with an electric motor, of means applied directly and locally to that part of the field-magnet pole which constitutes the rearward portion of the pole-piece and tending to weaken the same, as and for the purpose described.

3. In a dynamo-electric machine, a shunt-wound field-magnet having poles or pole-pieces which are provided with main-circuit helices.

4. The combination, with an electric motor, of a main-circuit coil applied in the manner described to the rearward one of two adjoining poles of the same name and tending to weaken such rearward portion, as and for the purpose described.

5. The combination, with the field-magnet and the rotary armature, of a main-circuit coil applied to the rearward one of two adjoining poles of the same name and tending to weaken the same, as and for the purpose described.

6. The combination, in an electric motor, of the two polar surfaces of the same name and an intermediate main-circuit coil applied as described, so as to tend to weaken one and strengthen the other of said surfaces, as and for the purpose described.

7. The combination, with a rotary armature, of two polar inducing surfaces of the same name but of different extent and a neutralizing-coil tending to weaken the pole of lesser extent, as and for the purpose described.

8. The combination, with the constant-potential mains, of an electric motor having its poles acted upon by an auxiliary coil in circuit with the armature branch and applied directly and locally to that part of the field-pole which constitutes the rearward portion of the same, as and for the purpose described.

9. The combination, with the constant-potential mains, of an electric motor having a shunt-field magnet and a coil in circuit with the armature applied to a field-pole in the manner described, so as to tend to weaken the rearward portion of the pole-piece.

10. The combination, with a field-magnet pole-piece, of a coil D, wound around said pole-piece as a core and in a plane intersecting the armature, the axis of said core and coil being substantially coincident, as shown and described.

11. The combination, with a field-magnet pole-piece, of a coil D, wound around said pole-piece in a plane intersecting the armature, the axis of said coil and bore being substantially coincident, and a closed conducting band or envelope, as and for the purpose described.

Signed at Lynn, in the county of Essex and State of Massachusetts, this 28th day of January, A. D. 1887.

ELIHU THOMSON.

Witnesses:
E. WILBER RICE, Jr.,
J. W. GIBBONEY.